(12) United States Patent
Agrawal et al.

(10) Patent No.: US 11,455,899 B2
(45) Date of Patent: Sep. 27, 2022

(54) TEACHING KIT AND METHOD TO DESIGN ONE OR MORE GAMES

(71) Applicant: Tata Consultancy Services Limited, Mumbai (IN)

(72) Inventors: Vasundhara Agrawal, Pune (IN); Sandeep Athavale, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 303 days.

(21) Appl. No.: 16/801,856

(22) Filed: Feb. 26, 2020

(65) Prior Publication Data

US 2020/0286395 A1    Sep. 10, 2020

(30) Foreign Application Priority Data

Mar. 5, 2019    (IN) .............................. 201921008532

(51) Int. Cl.
| | | |
|---|---|---|
| *G09B 5/02* | (2006.01) | |
| *G09B 19/00* | (2006.01) | |
| *G09B 19/22* | (2006.01) | |
| *A63F 13/60* | (2014.01) | |

(52) U.S. Cl.
CPC ................ *G09B 5/02* (2013.01); *A63F 13/60* (2014.09); *G09B 19/0053* (2013.01); *G09B 19/22* (2013.01)

(58) Field of Classification Search
CPC ...... G09B 5/02; G09B 19/0053; G09B 19/22; A63F 13/60
See application file for complete search history.

(56) References Cited

U.S. PATENT DOCUMENTS

| 5,078,403 A | * | 1/1992 | Chernowski, Jr. ........ A63F 1/00 273/299 |
| 9,126,118 B1 | * | 9/2015 | Harrison, Jr. ............. A63F 9/24 |
| 9,278,278 B1 | * | 3/2016 | Villarreal-Reyes .... G09B 19/22 |
| 2012/0156657 A1 | * | 6/2012 | Cogan ................... A63F 3/0434 434/129 |

(Continued)

OTHER PUBLICATIONS

Lucero, A. et al. "PLEX Cards: A Source of Inspiration When Designing for Playfulness," *Fun and Games '10: Proceedings of the 3rd International Conference on Fun and Games*, Leuven, Belgium, Sep. 15-17, 2010; pp. 28-37.

(Continued)

*Primary Examiner* — Robert J Utama
(74) *Attorney, Agent, or Firm* — Finnegan, Henderson, Farabow, Garrett & Dunner, LLP (57) ABSTRACT

Game designing is a process in which the game designers come up with game ideas. It is a creative and iterative process often requires a lot of effort. Existing methods are time consuming process and difficult to engage a person in it for longer duration. An electronic teaching kit and method to design one or more games have been disclosed. The electronic teaching kit enables game designers to generate multiple purposeful game ideas in a short session. The kit involves a framework comprising a set of genre cards, component cards and an interconnection is required between them to generate a coherent game idea. Further, the idea of game design is validated by all the designers participating the game designing session and using predefined conditions.

11 Claims, 7 Drawing Sheets

(56) References Cited

U.S. PATENT DOCUMENTS

2014/0110901 A1* 4/2014 Witchey .............. A63F 3/00138
273/297
2014/0194209 A1 7/2014 Ziouvelou et al.

OTHER PUBLICATIONS

Kultima, A. et al. "Designing 'Game Idea Generation' Games," *Proceedings of the 2008 Conference on Future Play: Research, Play, Share, Future Play 2008*, Toronto, Canada, Nov. 3-5, 2008; pp. 1-15.

Athavale, S. et al. "Understanding Game Ideation Through the Lens of Creativity Model," *The Fifth International Conference on Design Creativity (ICDC2018)*, Bath, UK, Jan. 31-Feb. 2, 2018; pp. 1-7.

Johansson, M. et al. (2005). "Playful Collaborative Exploration: New Research Practice in Participatory Design," *Journal of Research Practice*, vol. 1, issue 1; pp. 1-18.

* cited by examiner

TEACHING KIT AND METHOD TO DESIGN ONE OR MORE GAMES

PRIORITY CLAIM

This U.S. patent application claims priority under 35 U.S.C. § 119 to: India Application No. 201921008532, filed on 5 Mar. 2019. The entire contents of the aforementioned application are incorporated herein by reference.

TECHNICAL FIELD

The embodiments herein generally relates to the field of game design. More particularly, but not specifically, the invention provides an electronic teaching kit and method to designing one or more games.

BACKGROUND

Game designing is a process in which the game designers come up with game ideas through various creative techniques including brainstorming, which are generic methods for ideation. It is a highly creative endeavor and designers are under immense pressure to come up with new games every time.

The ability to design games is acquired through training. However mere training is not sufficient and designers can still struggle to generate new ideas. Though designers can use some existing principles or take support from other designers in their design process, better tools will benefit them in performing their activities faster and with greater assurance. The production cycle of a game is a long process and involves several creative inputs. The key inputs are being from the game designer herself/himself. Providing a methodical and well-rounded framework to formulate one's idea not only avoids rework but also reduces the production cost.

There are few existing methods available in the art which teach about the idea generation. The existing ideation processes facilitate only limited outcomes in a particular setup. Moreover, there are various other complexities involved in the existing game designing methods.

SUMMARY

Embodiments of the present disclosure present technological improvements as solutions to one or more of the above-mentioned technical problems recognized by the inventors in conventional systems. For example, one embodiment, herein provides an electronic teaching kit for designing games. The teaching kit comprises a display screen, a memory, a processor and at least one user interface. The display screen displays a framework, wherein the framework is accessed by an administrator. The framework further comprises an idea mat, a set of component cards, a set of changer cards and a set of genre cards. The idea mat is corresponding to a number of designers participating. The number of user interface is equal to the number of designers and the idea mats is displayed on the user interfaces for the designers to interact with. The user interface is configured to be operated by their respective designers, the processor is further configured to perform the following steps using the user interface as operated by the designers; picking a genre card by each of the number of designers; picking a designer intentions card by each of the number of designer, wherein the designer intentions card is one of the component cards; distributing three component cards to each of the number of designers by the administrator; picking one component card from the set of component cards by each of the designers for two turns, resulting in accumulation of six component cards and one genre card with each of the number of designers; picking the component card from the set of component cards each of the number of designers and replacing it with their existing cards until a set of six essential component cards are accumulated; designing the game by each of the number of designers separately using their genre card, wherein the game is designed by establishing a link between the game genre card and the six essential component cards; submitting the designed game by one of the number of designers for validation; and validating the designed game as valid by the other designers if a predefined condition is met.

In another aspect the embodiment here provides a method for designing games using an electronic teaching kit. Initially, an administrator is selected, wherein the administrator having an access to a framework of the electronic teaching kit to initiate a game design session, wherein the framework comprises an idea mat corresponding to a number of designers participating, a set of component cards, a set of changer cards and a set of genre card. In the next step, the number of designers participating are invited to use the teaching kit. Further, a genre card is picked by each of the designers. A designer intentions card is also picked by each of the designers, wherein the designer intentions card is one of the component cards. In the next step, three component cards are distributed to each of the designers by the administrator. One component card is then picked from the set of component cards by each of the designers for two turns, resulting in accumulation of six component cards and one genre card with each of the one or more designers. In the next step, the component card is picked from the set of component cards by each of the designers and replacing it with their existing cards until a set of six essential component cards are not accumulated. In the next step, the game is designed by each of the designers separately using their genre card, wherein the game is designed by establishing a link between the game genre card and the six essential component cards. The designed game is then submitted by one of the one or more designers for validation. And finally, the designed game is validated as valid by the other designers if a predefined condition is met. The predefined condition is the card headers collected are as per the idea mat and the interlinking of the content should flow as per the flow suggested in the idea mat.

In another aspect the embodiment here provides one or more non-transitory machine readable information storage mediums comprising one or more instructions which when executed by one or more hardware processors cause designing games using an electronic teaching kit. Initially, an administrator is selected, wherein the administrator having an access to a framework of the electronic teaching kit to initiate a game design session, wherein the framework comprises an idea mat corresponding to a number of designers participating, a set of component cards, a set of changer cards and a set of genre card. In the next step, the number of designers participating are invited to use the teaching kit. Further, a genre card is picked by each of the designers. A designer intentions card is also picked by each of the designers, wherein the designer intentions card is one of the component cards. In the next step, three component cards are distributed to each of the designers by the administrator. One component card is then picked from the set of component cards by each of the designers for two turns, resulting in accumulation of six component cards and one genre card with each of the one or more designers. In the next step, the component card is picked from the set of component cards by each of the designers and replacing it with their existing cards until a set of six essential component cards are not accumulated. In the next step, the game is designed by each of the designers separately using their genre card, wherein the game is designed by establishing a link between the game genre card and the six essential component cards. The designed game is then submitted by one of the one or more designers for validation. And finally, the designed game is validated as valid by the other designers if a predefined condition is met. The predefined condition is the card headers collected are as per the idea mat and the interlinking of the content should flow as per the flow suggested in the idea mat.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

Figure 1:
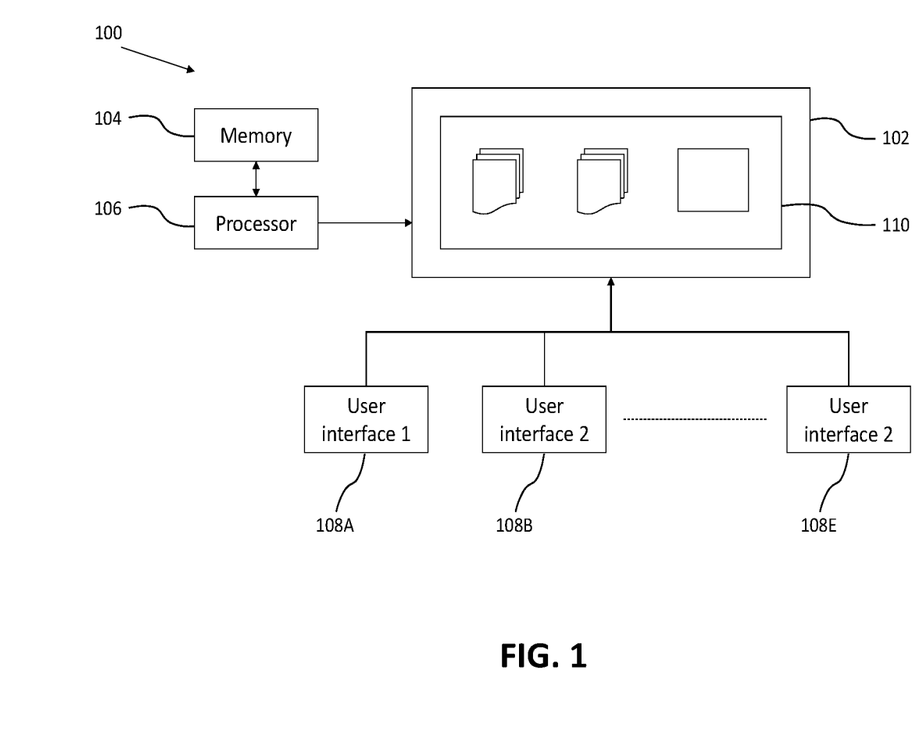
FIG. 1 illustrates a block diagram of an electronic teaching kit to design one or more games according to an embodiment of the present disclosure.

According to an embodiment of the disclosure, an electronic teaching kit 100 to design one or more games is shown in the block diagram of FIG. 1. The electronic teaching kit 100 enables game designers to generate multiple purposeful game ideas in a short session. The kit 100 also enables a peer to peer interactive learning system which makes easy knowledge exchange possible for the game designers. The electronic teaching kit 100 is designed on a validated framework it also ensures the presence of the necessary components and thus the quality of the outcomes. The electronic teaching kit 100 also provides a facility to input multiple different topics or content types, this enables to get results on multiple topics to work at the same time. Moreover, the electronic teaching kit 100 also provides the business multiple options to evaluate and choose the correct one, thus reducing the need for iterations during the production phase.

According to an embodiment of the disclosure, the electronic teaching kit 100 comprises a display screen 102, a memory 104, a processor 106 and at least one user interface 108 as shown in the block diagram of FIG. 1. The processor 106 works in communication with the memory 104. For using the electronic teaching kit 100 a number of designers are required. In the present embodiment, a minimum of 2 designers are required and a maximum of five designers can participate in the process of designing games. The processor 106 further configured to perform the various steps using the user interface 108 as operated by the designers.

The number of user interface 108 is dependent on a number of designers participating in the designing of games using the teaching kit 100. A separate user interface (108A, 108B, . . . 108E) is required for the separate designers as shown in FIG. 1. The user interface 102 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

Figure 2:
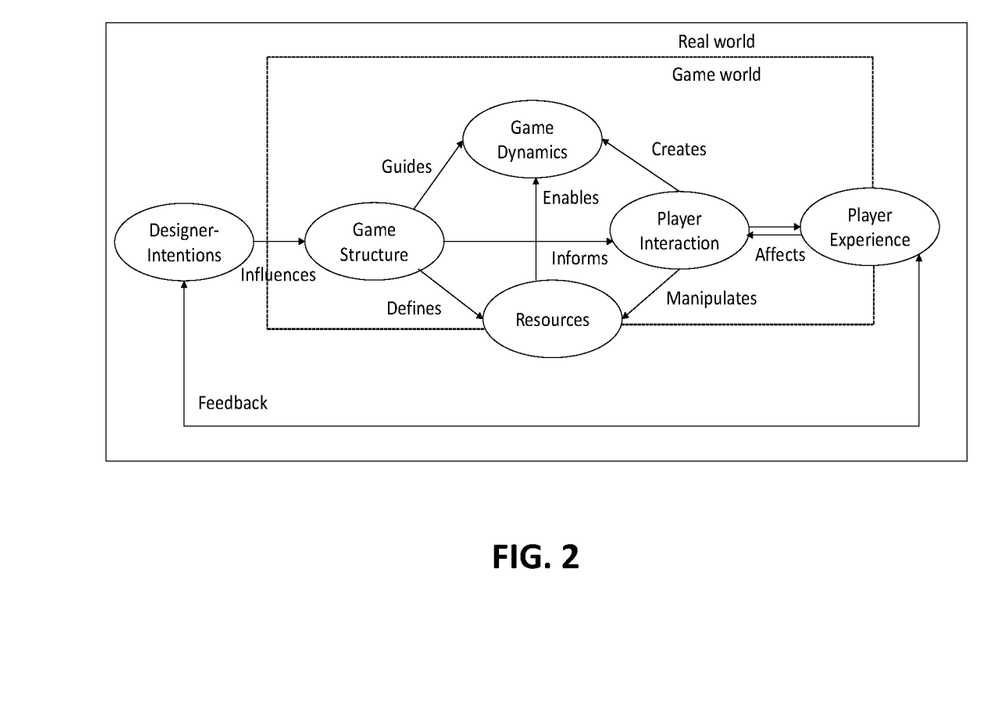
FIG. 2 shows the schematic representation of the framework of the electronic teaching kit according to an embodiment of the present disclosure.

One of the number of designers acts as an administrator of the electronic teaching kit 100. Only the administrator has the access to a framework 110 of the electronic teaching kit 100 to initiate the game design session. When the administrator initiates a session he/she sends out invites for the session to the designers. The game design session can also be participant initiated. In both case the administrator can also participate. The framework 110 of the electronic teaching kit 100 is shown in FIG. 2. The framework 110 can be displayed on the display screen 102. Only administrator is configured to add the designers for the game designing session. Moreover, the designers can also choose an administrator among themselves and the administrator can also be a participant in the game design process.

According to an embodiment of the disclosure, the designers has to operate with the dataset as decided by the administrator. Whenever the administrator logs into the framework 110. There are two options available for him. First, design with default dataset and second, edit the dataset. Table 1 below shows a default data table. In case the administrator selects to edit dataset he/she gets to populate the data table under the six component headers as per the requirement of the situation. The administrator then adds other designers to the game designing session. In the present embodiment, the administrator can at the most add 5 designers (including himself/herself). Though it should be appreciated that with few modification the kit can be modified to include more than 5 designers by a person skilled in the art. Only the administrator can create a game designing session.

TABLE 1

Default dataset available at the start of the game designing process

| Designer Intentions | Game Structure | Game Dynamics | Game Resource | Player Interaction | Player Experience |
|---|---|---|---|---|---|
| Purpose is to spread awareness Context: Medical Units | Collect | events, timer, turn, initiatives | Coins, Jewels, money earned | Mystery | It should be a game of endurance |
| Purpose is Crisis Management Context: Anytime/Anywhere | Destroy | Action: Spatial movement | Speed | Extreme adventure | The game needs the designers to use their motor skills |
| Purpose is to teach or learn Context: Village Space | Solve | State Change: Enables new scores | Team/team members | Entertainment and fun | The game requires the designers to calculate and solve |
| Purpose is Conflict Resolution. Context: Anytime/Anywhere | Race | Emergence: affects risk | Fuel | Cultural awareness | The game restricts verbal communication |
| Purpose is Behaviour Change. Context: Workspace | Complete | State change: Affects resources | Number of attempts | Fellowship | The designers need to share resources |
| Purpose is to Induce Fellowship. Context: Public Space | Escape | State Change: Enables additional lives | designers health | Learning experience | The game requires mental effort |
| Purpose is Problem Solving. Context: Local Space | Build | Action: temporal movement | Time | Excitement, Adrenalin rush | The designers need to trade resources |

According to an embodiment of the disclosure, the electronic teaching kit 100 comprises three kinds of cards, namely a set of genre cards, a set of components cards and a set of changer cards. The various type of set of cards are presented in the form of e-cards to the designers on the display screen 102. These cards are initially placed front side down so that the content is not visible to the designers.

The set of genre cards define the genre of the game designing. The game designing starts with each designer picking a genre card at random from the screen using their respective user interface 108. Besides the genre card each designer also gets a designer intentions card, which is a type of component card. It is mandatory to distribute the designer intentions card in the beginning of the game design process as it contributes to the theme of the game designing. The remaining designer intentions cards are then shuffled with the rest of the set of component and the set of changer cards. A set of three cards is then distributed to each designer.

All the designers then pick cards from the deck of remaining cards for the first two rounds. After the first two rounds most of the designers will be left with six cards with them excluding the genre card. In addition to that each designer also get one claim token which can be used to claim a card from the other designer.

Therefore third round onwards the designers can pick a card from the deck or from the discarded pile of cards (by other designers). In case of a card being picked up only the top most card is available for picking.

Figure 3:
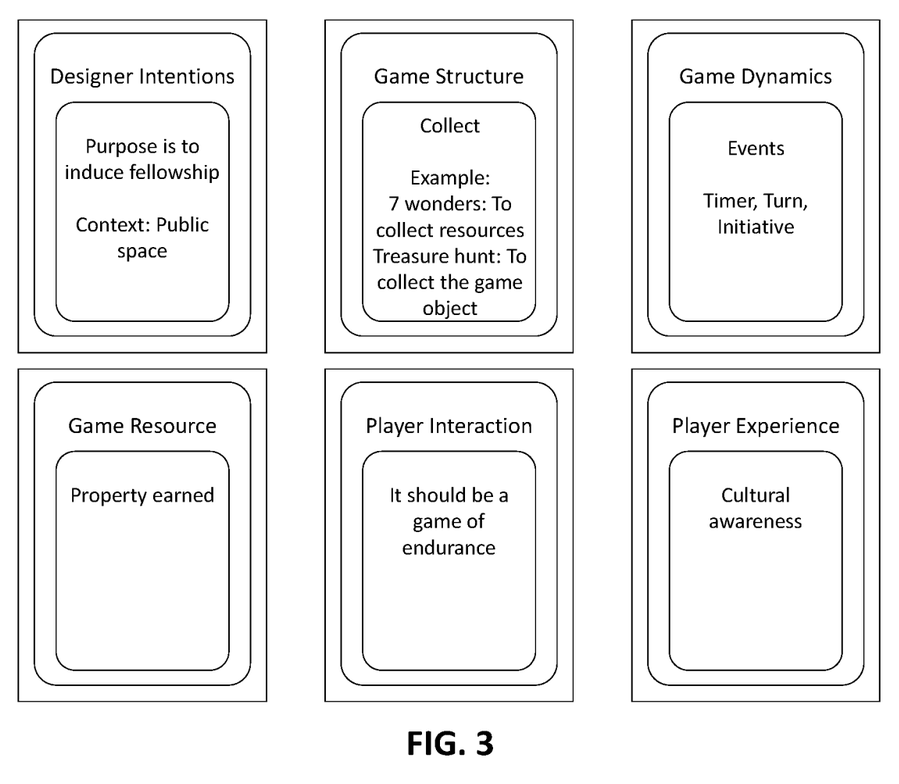
FIG. 3 shows a set of component cards used in the game designing process according to an embodiment of the disclosure.

As the designers keep collecting the six essential component cards each component card enables the designers to decide on a particular aspect of the game which they are designing. Like the 'game resource' card defines the resource in the game and the 'player interaction' card defines the interaction the designers wants to bring in his game. As the game progresses the designers need to collect six different component cards namely: Game Structure, Designer Intentions, Game Resources, Game Dynamics, Player Interaction and Player Experience. The set of component cards are shown in FIG. 3.

Figure 4:
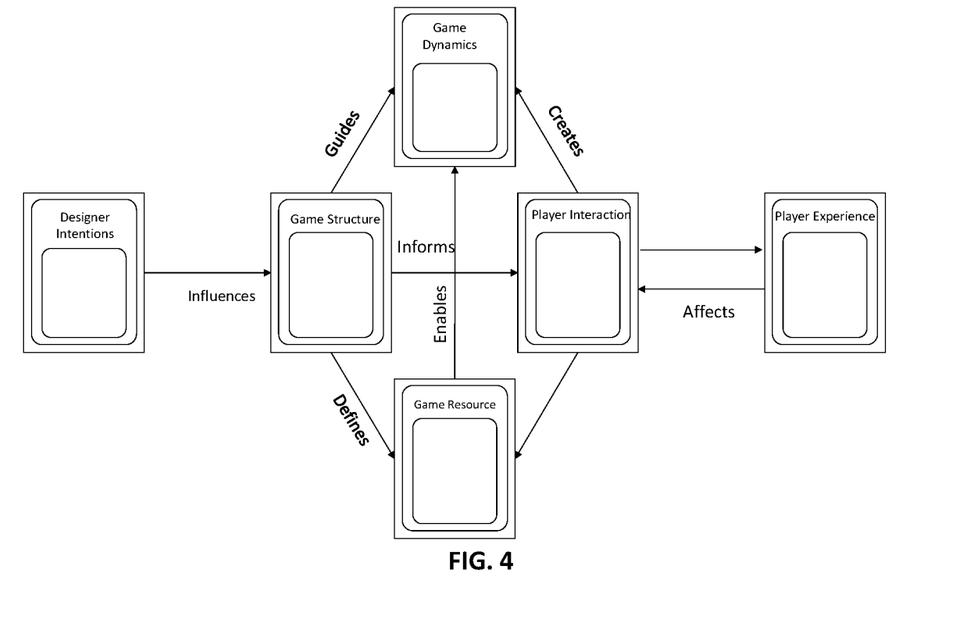
FIG. 4 shows the implementation of the framework of FIG. 2 using the interconnection between the set of component cards in the electronic teaching kit according to an embodiment of the disclosure.

These six components correspond to six essential requirements that are required to design the game idea, wherein these components are inter linked with each other as shown in FIG. 4. These cards are explained as follows:

- The game structure component regulates the goal of the task designed which can be to collect, solve, race, destroy, complete, capture, escape or build.
- The designer intention component which specifies the purpose and theme of the particular game which is to be designed. The purpose specified by the designer intention component influences the game structure component.
- The game resource component defines the resources a designer needs to include in their game. The eight resource elements included in the existing kit are team/team members, number of attempts, property earned, time, coins, speed, team, fuel and designer health. The resource component also enables the game dynamics component.

The game dynamics component is guided by the game structure and is enabled by the game resources. The primary game dynamics elements used in the electronic teaching kit are action, emergence and state change. These elements are created through player interaction hence the designer needs to inter relate them accordingly.

The player interaction component also manipulates the resources after deriving information from the game structure. The kit currently defines a set of 8 player interactions that a designer may want to create however a designer may also define their own player interactions. The system rules are thus defined by the kind of player interactions intended by the designer.

The player experience component specifies the action to be performed by the user the game may need the users to use their motor skills, calculate and solve, cooperate, share resources, trade resources, display endurance etc. The player experience in turn affects the player interaction, this affect leads to changes in the methods of interaction. The player experience also provides feedback to the designer and helps them include effective changes in their game.

Once the designer is in possession of all the six required component cards and is ready with the game idea he/she can declare a 'share session' using his/her user interface 108. In this session his/her game idea is shared with all the designers participating the session. Other designers can declare the idea valid or invalid depending on the predefined condition. The predefined condition is presence of all the component cards and a valid linkage between the component cards and the genre card. If the designer uses all the components as per the collected cards his/her game idea is declared valid, if not he/she has to take back his/her card and continue designing. Each of the designers may also vote either in favor or against the game design. A game is accepted as valid if the number of votes is just n−1 where n is the number of designers and n<=5. In case a designer declares and game idea validated, the other designers might also choose to share their game ideas or continue designing till the game has only one designer left. Also, if the declaration of the game idea is proved invalid or incomplete then the designer has to withdraw his/her claim and keep designing the game. However a designer can declare their game only twice. After which they can keep designing but not declare their game idea. The declaration of ideas can be made using a voice recording or textual input.

Figure 5:
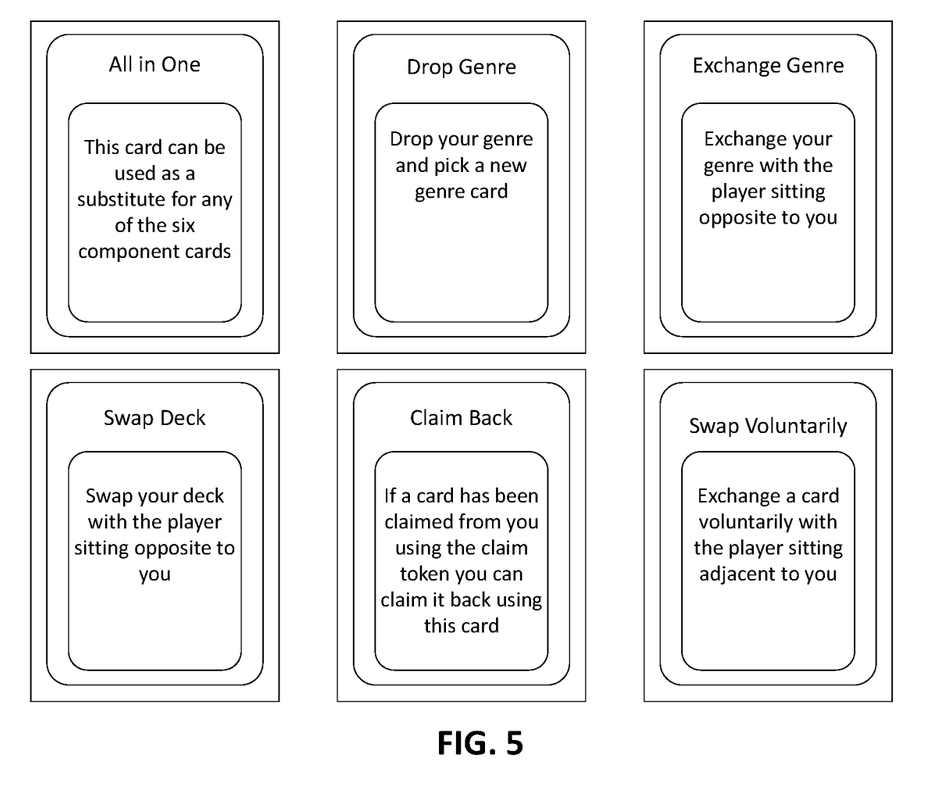
FIG. 5 shows a set of changer cards used in game designing process according to an embodiment of the disclosure.
Figure 6A:
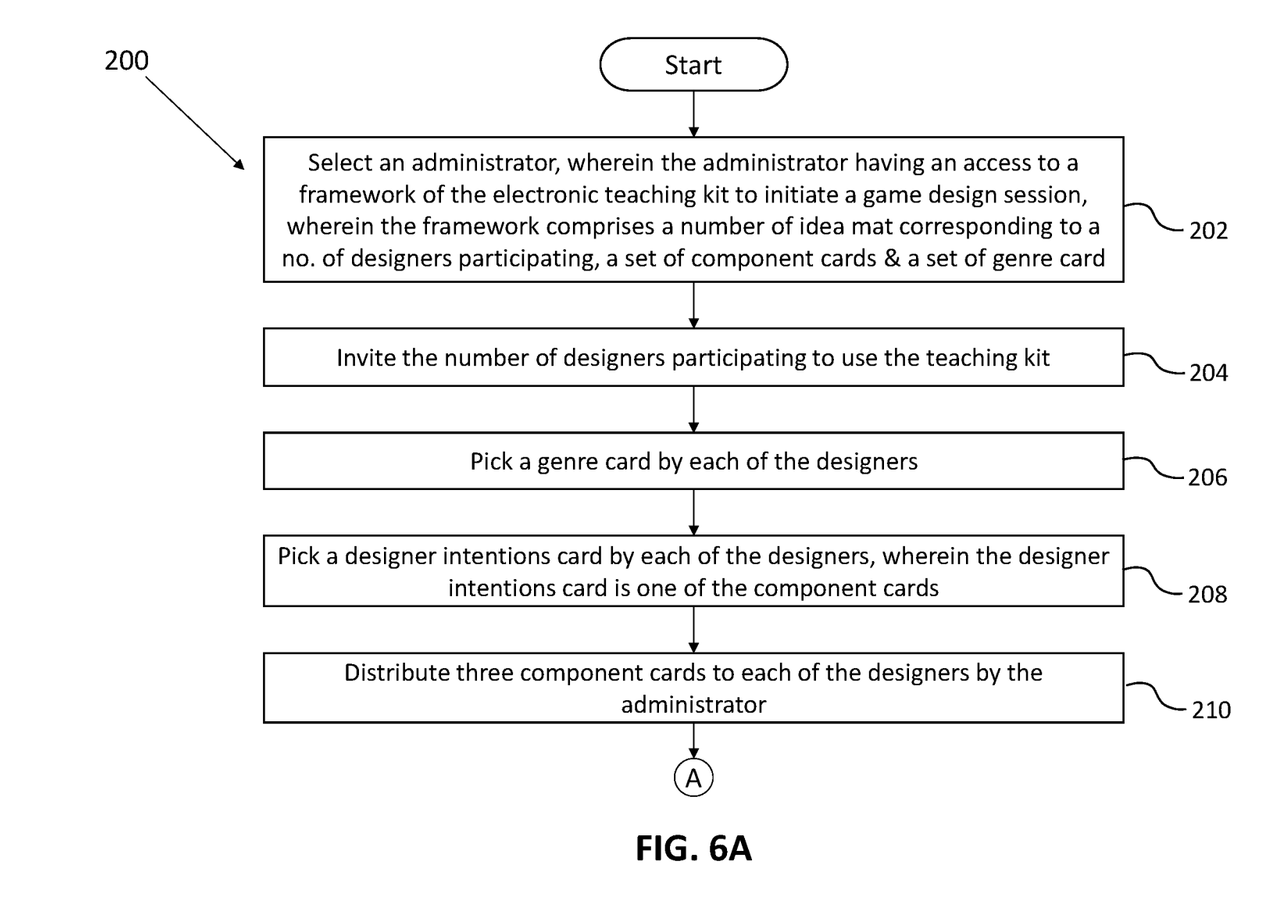
FIG. 6A-6B is a flowchart illustrating the steps involved to design one or more games using the electronic teaching kit according to an embodiment of the present disclosure.

According to an embodiment of the disclosure, the framework 110 also has a set of changer cards as shown in FIG. 5. The set of changer cards have been explained as follows:

All in one—This card can be used as a substitute for any of the six component cards Drop genre—This card will allow the designer to drop their current genre card and pick a new genre card Exchange genre—This card will allow the designer to exchange their current genre card with the designer sitting opposite to you Swap deck—This card will allow the designer to swap their deck with the designer sitting opposite to you Claim back—If a card has been claimed from first designer using the claim token you can claim it back using this card Swap voluntarily—Exchange a card voluntarily with the designer sitting adjacent to you In operation, a flowchart 200 illustrating a method for designing games using the electronic teaching kit 100. Initially at step 202, the access is provided to the framework 110 of the electronic teaching kit to the administrator. Further, only the administrator can provide access to other designers. The framework 110 comprises an idea mat corresponding to the number of designers participating, the set of component cards and the set of genre card. In addition to that, there are also the set of changer cards which are used in game designing process as mentioned above. In the next step 204, the number of designers are selected by the administrator to use the electronic teaching kit 100.

In the next step 206, a genre card is picked by each of the designers. Similarly, at step 208, a designer intentions card is picked by each of the designers, wherein the designer intentions card is one of the component cards. It should be appreciated that each of the cards are the cards visible on the display screen 102 but facing downwards and content is not visible to the designers. The picking of the cards is done by the designers using their respective user interface 108. In the next step 210, three component cards are distributed to each of the designers by the administrator.

Figure 6B:
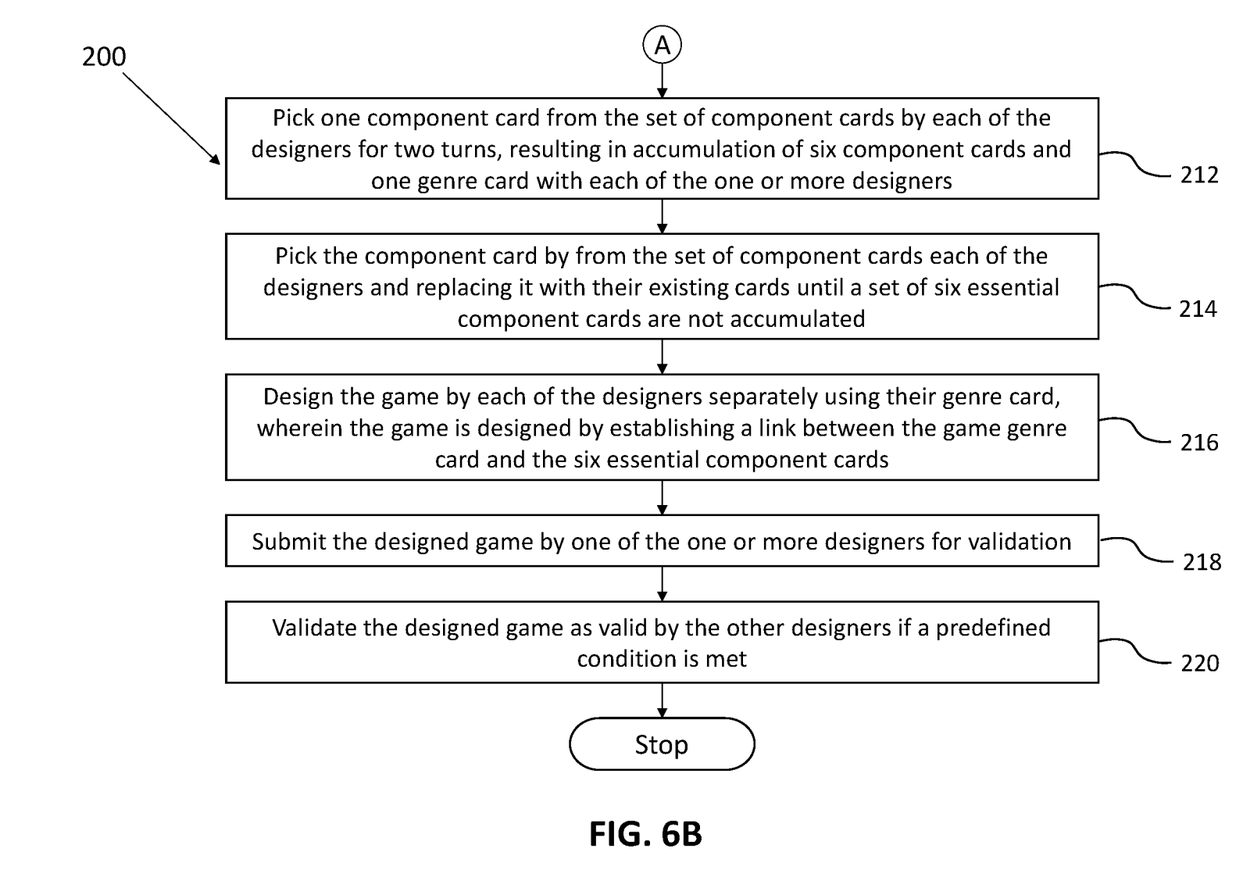

In the next step 212, one component card is picked from the set of component cards by each of the designers for two turns, resulting in accumulation of six component cards and one genre card with each of the one or more designers. In addition to this, each of the designers may also contain the claim token. At step 214, the component card is picked from the set of component cards by each of the designers and replace it with their existing cards until a set of six essential component cards are not accumulated.

In the next step 216, the game is designed by each of the designers separately using their genre card, wherein the game is designed by establishing a link between the game genre card and the six essential component cards. At step 218, the designed game is submitted by the one of the one or more designers for validation. And finally at step 220, the designed game is validated by other designers. The game is declared as a valid games if a predefined condition is met. The predefined condition is presence of all the component cards and a valid linkage between the component cards and the genre card. In addition to this, each of the designers vote either in favor or against the game design, the game is accepted as valid only if the number of votes is just n−1 where n is the number of designers and n<=5.

According to an embodiment of the disclosure, the electronic tool kit 100 can also be provided with an artificial participant. The artificial participant also performs connection in parallel to the human designer. The discarded cards can be picked up by artificial agents or other human participants to create their chain. This interactivity forces designers to be on the toes and also observe and learn from what the artificial participant is doing.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for designing games using an electronic teaching kit, the method comprising a processor implemented steps of:
    selecting an administrator, wherein the administrator having an access to a framework of the electronic teaching kit to initiate a game design session, wherein the framework, displayed on a display screen of the electronic teaching kit, comprises a number of idea mat corresponding to a number of designers participating, a set of component cards and a set of genre card, wherein the electronic teaching kit enables a peer to peer interactive learning system for knowledge exchange between the designers,
    wherein the set of component cards comprises designer intentions cards, game structure cards, game dynamics cards, game resources cards, player interaction cards and player experience cards provide feedback to the designer and help to include effective changes in the game;
    inviting the number of designers participating to use the electronic teaching kit, wherein the electronic teaching kit provides a facility to input multiple topics or content types by the designers, thereby enabling to obtain results on the multiple topics to work at same time;
    picking a genre card by each of the designers using respective user interface operated by a respective designer;
    picking a designer intentions card by each of the designers, wherein the designer intentions card is one of the component cards, wherein the set of genre cards, the set of components card, a set of changer cards are presented in form of e-cards to the designers on the display screen and initially placed front side down so that content is not visible to the designers;
    distributing three component cards to each of the designers by the administrator, wherein the remaining designer intentions cards are shuffled with rest of the set of components card and the set of changer cards;
    picking one component card from the set of component cards by each of the designers for two turns, resulting in accumulation of six component cards and one genre card with each of the one or more designers;
    picking the component card from the set of component cards by each of the designers and replacing the existing component card until a set of six essential component cards are accumulated;
    designing the game by each of the designers separately using their genre card, wherein the game is designed by establishing a link between the game genre card and the six essential component cards;
    submitting the designed game by the one of the one or more designers for validation in a share session using the respective user interface; and
    validating the designed game as valid by the other designers if a predefined condition is met,
    wherein the electronic tool kit is provided with an artificial participant, performing connection in parallel to the number of designers, picking discarded cards from the designers, allowing the designers to observe and learn from activities performed by the artificial participant.

2. The method of claim 1, wherein the predefined condition is presence of all the component cards and a valid linkage between the component cards and the genre card, wherein if the designer uses all the component cards then the game designed by the designer is declared valid, and each of the designers vote either in favor or against the game design shared in the share session and the game design is accepted as valid if number of votes is 'n-1', where 'n' is a number of designers and 'n' is less than and equal to 5.

3. The method of claim 1, wherein the framework further comprising a claim token configured to be used to claim the component card from the other designers during the step of picking the component cards during the initial two turns.

4. The method of claim 1 further comprising the step of selecting a default data set of editing the dataset by the administrator before the start of game design.

5. The method of claim 1 wherein the administrator is configured to add a maximum of 5 designers to be involved in the electronic teaching kit.

6. The method of claim 1, wherein the framework comprising the set of changer cards.

7. The method of claim 1 further comprising the step of logging in to the framework either as the administrator or the designer before using the electronic teaching kit.

8. An electronic teaching kit for designing games, the electronic teaching kit comprises:
    a display screen displaying a framework, wherein the electronic teaching kit enables a peer to peer interactive learning system for knowledge exchange between the designers, wherein the framework is accessed by an administrator, the framework, displayed on a display screen of the electronic teaching kit, further comprises:
        a number of idea mats, wherein the number of idea mats correspond to a number of designers participating,
        a set of component cards, and
        a set of genre card;
    a memory;
    a processor in communication with the memory; and
    at least one user interface, wherein the number of user interface is corresponding to the number of designers participating, the user interface configured to be operated by their respective designers, and the idea mats is displayed on the user interfaces for the designers to interact with;

wherein the set of component cards comprises designer intentions cards, game structure cards, game dynamics cards, game resources cards, player interaction cards and player experience cards provide feedback to the designer and help to include effective changes in the game;

inviting the number of designers participating to use the electronic teaching kit, wherein the electronic teaching kit provides a facility to input multiple topics or content types by the designers, thereby enabling to obtain results on the multiple topics to work at same time;

picking a genre card by each of the number of designers using respective user interface operated by a respective designer;

picking a designer intentions card by each of the number of designer, wherein the designer intentions card is one of the component cards, wherein the set of genre cards, the set of components card, a set of changer cards are presented in form of e-cards to the designers on the display screen and initially placed front side down so that content is not visible to the designers;

distributing three component cards to each of the number of designers by the administrator, wherein the remaining designer intentions cards are shuffled with rest of the set of components card and the set of changer cards;

picking one component card from the set of component cards by each of the designers for two turns, resulting in accumulation of six component cards and one genre card with each of the number of designers;

picking the component card from the set of component cards by each of the number of designers and replacing the existing component until a set of six essential component cards are accumulated;

designing the game by each of the number of designers separately using their genre card, wherein the game is designed by establishing a link between the game genre card and the six essential component cards;

submitting the designed game by the one of the number of designers for validation in a share session using the respective user interface; and validating the designed game as valid by the other designers if a predefined condition is met, wherein the electronic tool kit is provided with an artificial participant, performing connection in parallel to the number of designers, picking discarded cards from the designers, allowing the designers to observe and learn from activities performed by the artificial participant.

9. One or more non-transitory machine readable information storage mediums comprising one or more instructions which when executed by one or more hardware processors cause managing a plurality of events, the instructions cause:

selecting an administrator, wherein the administrator having an access to a framework of the electronic teaching kit to initiate a game design session, wherein the framework, displayed on a display screen of the electronic teaching kit, comprises a number of idea mat corresponding to a number of designers participating, a set of component cards and a set of genre card, wherein the electronic teaching kit enables a peer to peer interactive learning system for knowledge exchange between the designers, wherein the set of component cards comprises designer intentions cards, game structure cards, game dynamics cards, game resources cards, player interaction cards and player experience cards provide feedback to the designer and help to include effective changes in the game;

inviting the number of designers participating to use the electronic teaching kit, wherein the electronic teaching kit provides a facility to input multiple topics or content types by the designers, thereby enabling to obtain results on the multiple topics to work at same time;

picking a genre card by each of the designers using respective user interface operated by a respective designer;

picking a designer intentions card by each of the designers, wherein the designer intentions card is one of the component cards, wherein the set of genre cards, the set of components card, a set of changer cards are presented in form of e-cards to the designers on the display screen and initially placed front side down so that content is not visible to the designers;

distributing three component cards to each of the designers by the administrator, wherein the remaining designer intentions cards are shuffled with rest of the set of components card and the set of changer cards;

picking one component card from the set of component cards by each of the designers for two turns, resulting in accumulation of six component cards and one genre card with each of the one or more designers;

picking the component card from the set of component cards by each of the designers and replacing the existing component card until a set of six essential component cards are accumulated;

designing the game by each of the designers separately using their genre card, wherein the game is designed by establishing a link between the game genre card and the six essential component cards;

submitting the designed game by the one of the one or more designers for validation in a share session using the respective user interface; and validating the designed game as valid by the other designers if a predefined condition is met, wherein the electronic tool kit is provided with an artificial participant, performing connection in parallel to the number of designers, picking discarded cards from the designers, allowing the designers to observe and learn from activities performed by the artificial participant.

10. The method of claim 1, wherein the designer intentions cards specifies the purpose and theme of the game that is to be designed and purpose specified by the designer intention cards influence the game structure cards, wherein the game structure cards regulate the goal of a task designed that is to collect, solve, race, destroy, complete, capture, escape or build, wherein the game dynamics cards are guided by a game structure and is enabled by the game resources, and game dynamics elements used in the electronic teaching kit are action, emergence and state change, wherein the game resources cards define the resources that the designer needs to include in the game, and the game resource cards enable the game dynamics component, wherein the player interaction cards manipulate resources after deriving information from the game structure, and wherein the player experience cards specify an action to be performed by an user such as to use motor skills, calculate and solve, cooperate, share resources, trade resources, and display endurance.

11. The method of claim 1, wherein the set of charger cards include 'All in one' used as a substitute for any of the six component cards, 'Drop genre' allowing the designer to drop their current genre card and pick a new genre card, 'Exchange genre' allowing the designer to exchange their current genre card with the designer sitting opposite to you, 'Swap deck' allowing the designer to swap a deck with the designer sitting opposite to you, 'claim back'-if a card has been claimed from a first designer using the claim token then the other designer claims the claim token back using the claim back card, and 'Swap voluntarily' refers to exchange a card voluntarily with the designer sitting adjacent.

\* \* \* \* \*